US009930652B2

(12) United States Patent
Rashid et al.

(10) Patent No.: US 9,930,652 B2
(45) Date of Patent: Mar. 27, 2018

(54) EVOLVED NODE-B, USER EQUIPMENT AND METHODS FOR TRANSITION BETWEEN UNLICENSED AND LICENSED FREQUENCY BANDS

(71) Applicant: Intel Corporation, Santa Clara, CA (US)

(72) Inventors: Mohammad Mamunur Rashid, Hillsboro, OR (US); Kathiravetpillai Sivanesan, Portland, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 14/575,589

(22) Filed: Dec. 18, 2014

(65) Prior Publication Data

US 2016/0183220 A1    Jun. 23, 2016

(51) Int. Cl.
*H04W 4/00* (2009.01)
*H04W 72/04* (2009.01)
*H04W 24/02* (2009.01)

(52) U.S. Cl.
CPC ......... *H04W 72/042* (2013.01); *H04W 24/02* (2013.01)

(58) Field of Classification Search
CPC ............................ H04W 72/042; H04W 24/02
USPC .................................................. 370/310–350
See application file for complete search history.

(56) References Cited

U.S. PATENT DOCUMENTS

| 2010/0317339 A1* | 12/2010 | Koc | H04L 5/0007 455/424 |
|---|---|---|---|
| 2013/0143502 A1 | 6/2013 | Kazmi et al. | |
| 2015/0126207 A1* | 5/2015 | Li | H04W 72/082 455/452.1 |
| 2015/0304872 A1* | 10/2015 | Sadek | H04W 24/10 370/252 |

FOREIGN PATENT DOCUMENTS

| WO | WO-2013033907 A1 | 3/2013 |
|---|---|---|
| WO | WO-2013179095 A1 | 12/2013 |
| WO | WO-2016100014 A1 | 6/2016 |

OTHER PUBLICATIONS

"Data scheduling and control signaling in LAA", R1-144904, 3GPP TSG RAN WG1 Meeting #79, (Nov. 8, 2014), 4 pgs.

(Continued)

*Primary Examiner* — Ricky Ngo
*Assistant Examiner* — Wei-Po Kao
(74) *Attorney, Agent, or Firm* — Schwegman Lundberg & Woessner, P.A.

(57) ABSTRACT

Embodiments of an Evolved Node-B (eNB) to support Carrier Aggregation (CA) of a licensed frequency band and an unlicensed frequency band are disclosed herein. The eNB may transmit traffic packets on an unlicensed channel in the unlicensed frequency band to one or more User Equipments (UEs) assigned to the unlicensed channel. The eNB may receive, on the licensed frequency band, interference indicators for the unlicensed channel from at least a portion of the UEs assigned to the unlicensed channel. In addition, the eNB may transmit, on the licensed frequency band, a multicast vacate channel control message for the unlicensed channel. The message may be for reception at one or more of the UEs assigned to the unlicensed channel.

25 Claims, 9 Drawing Sheets

(56) References Cited

OTHER PUBLICATIONS

"Discussion on carrier selection for LAA", Samsung, R1-144740, 3GPP TSG RAN WG1 #79, (Nov. 8, 2014).
"International Application Serial No. PCT/US2015/064489, International Search Report dated Mar. 22, 2016", 3 pgs.
"International Application Serial No. PCT/US2015/064489, Written Opinion dated Mar. 22, 2016", 6 pgs.

* cited by examiner

EVOLVED NODE-B, USER EQUIPMENT AND METHODS FOR TRANSITION BETWEEN UNLICENSED AND LICENSED FREQUENCY BANDS

TECHNICAL FIELD

Some embodiments pertain to wireless communications. Some embodiments relate to cellular communication networks including LTE networks. Some embodiments relate to Carrier Aggregation (CA) of multiple frequency bands, including licensed and unlicensed frequency bands. Some embodiments relate to interference caused by uncoordinated networks. Some embodiments relate to multicast control messages, particularly for large groups of mobile devices.

BACKGROUND

Mobile networks may increase available bandwidth, throughput or capacity using techniques such as carrier aggregation (CA), in which multiple frequency bands may be supported simultaneously. As an example, a base station operating in a licensed frequency band may augment its resources by communicating with mobile devices over additional unlicensed frequency bands. Although the use of unlicensed frequency bands may provide a cost-effective increase in resources, additional challenges related to interference from other systems or devices also operating in those unlicensed bands may arise. Interference avoidance or mitigation techniques may be especially challenging when the number of mobile devices supported is large. Accordingly, there is a general need for methods that enable such interference avoidance, and particularly for large quantities of mobile devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
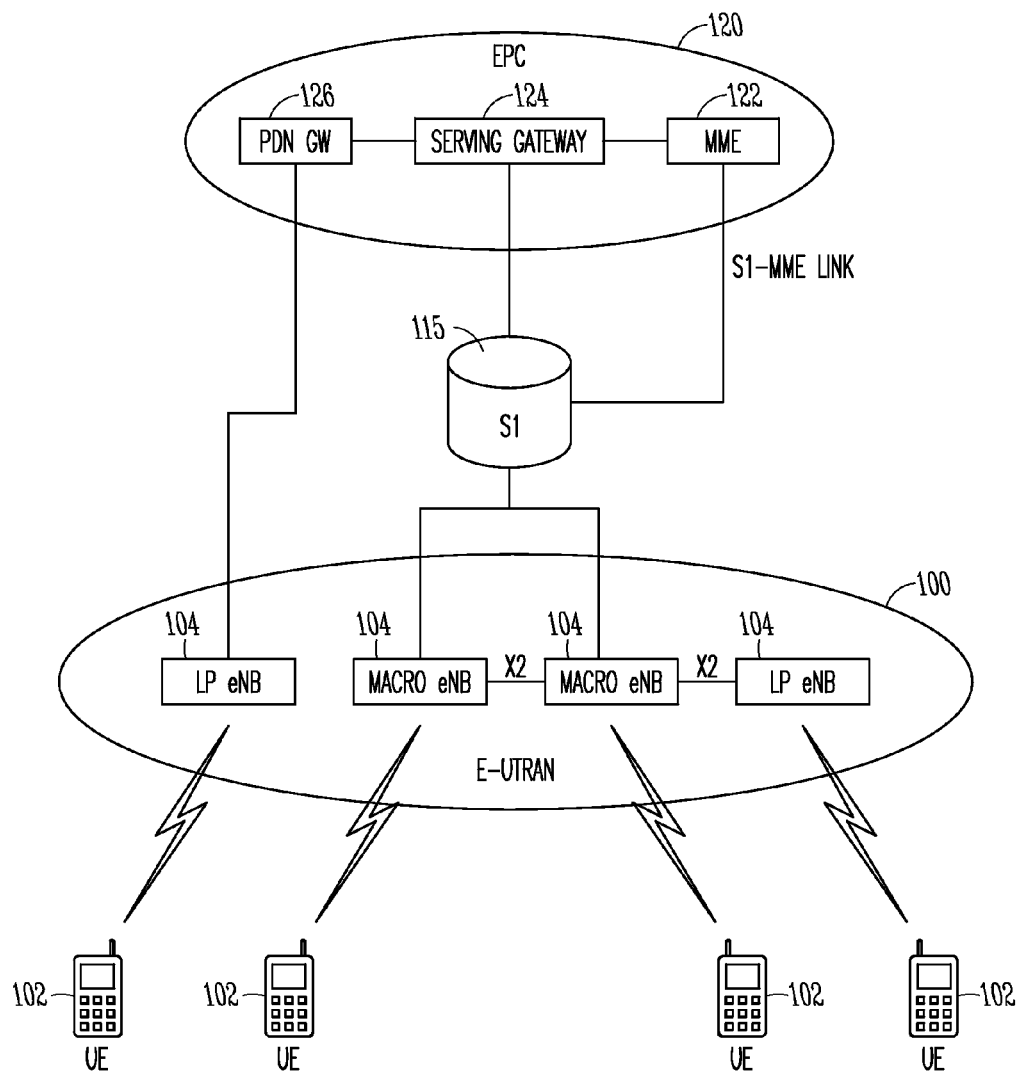
FIG. 1 is a functional diagram of a 3GPP network in accordance with some embodiments.

FIG. 1 is a functional diagram of a 3GPP network in accordance with some embodiments. The network may comprise a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes traffic packets (such as data packets or voice packets) between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes traffic packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

In accordance with some embodiments, the eNB 104 may receive, on a licensed frequency band, interference indicators for an unlicensed channel from at least a portion of the UEs 102 assigned to the unlicensed channel. In addition, the eNB 104 may transmit, on the licensed frequency band, a multicast vacate channel control message for the unlicensed channel. The message may be for reception at one or more of the UEs 102 assigned to the unlicensed channel. Accordingly, the eNB 104 and the UEs 102 may be configured to communicate or may be capable of communication over both licensed and unlicensed frequency bands in some embodiments. Such communication in either type of frequency band may utilize some or all of the network 100 and its components. These embodiments are described in more detail below.

The S1 interface 115 is the interface that separates the RAN 100 and the EPC 120. It is split into two parts: the S1-U, which carries traffic packets between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
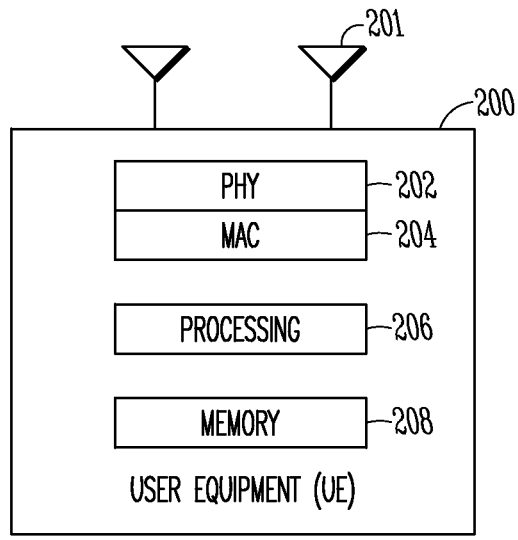
FIG. 2 is a functional diagram of a User Equipment (UE) in accordance with some embodiments.
Figure 3:
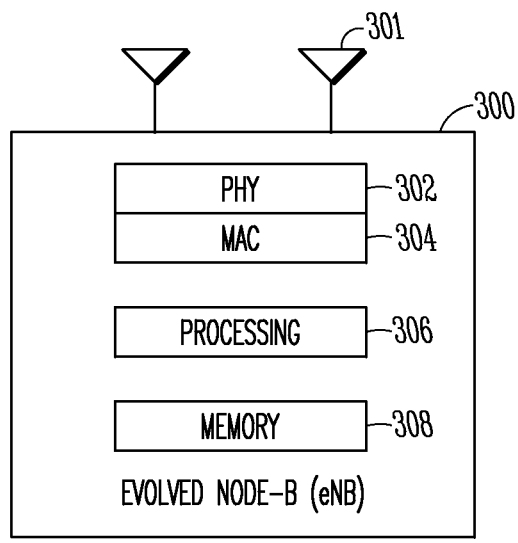
FIG. 3 is a functional diagram of an Evolved Node-B (eNB) in accordance with some embodiments.

FIG. 2 is a functional diagram of a User Equipment (UE) in accordance with some embodiments. FIG. 3 is a functional diagram of an Evolved Node-B (eNB) in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the eNB 104 may support Carrier Aggregation (CA) of a licensed frequency band and an unlicensed frequency band. The eNB 104 may transmit traffic packets on an unlicensed channel in the unlicensed frequency band to one or more UEs 102 assigned to the unlicensed channel. The eNB 104 may receive, on the licensed frequency band, interference indicators for the unlicensed channel from at least a portion of the UEs 102 assigned to the unlicensed channel. In addition, the eNB 104 may transmit, on the licensed frequency band, a multicast vacate channel control message for the unlicensed channel. The message may be for reception at one or more of the UEs 102 assigned to the unlicensed channel. These embodiments are described in more detail below.

The UE 102 and eNB 104 may support CA of multiple frequency bands, in which an increase in capacity or throughput over a single band arrangement may be realized through communication on the multiple frequency bands. In some embodiments, a combination of licensed and unlicensed frequency bands may be used, but these are not limiting. In some embodiments, multiple frequency bands of one type (licensed or unlicensed) may be used. As part of the CA, the licensed frequency band may support one or more primary cells (Pcell) of UEs 102 and the unlicensed frequency band may support one or more secondary cells (Scell) of UEs 102. Accordingly, UEs 102 included in the Scells may be configured for unlicensed LTE (LTE-U) operation as part of the CA, and may be configured to support various aspects of LTE-Advanced or other 3GPP evolutions or upgrades.

Communication over the multiple frequency bands may take place simultaneously, in some cases. Referring back to FIGS. 2-3, such communication may be accommodated by the UE 102 (or the UE 200) using one or more antennas 201. Some or all of the antennas 201 may be configured for simultaneous operation in multiple frequency bands, while some or all of those antennas 201 may be configured for operation in a single frequency band. In addition, any suitable combination of such antennas 201 may also be used. The communication may be accommodated by the eNB 104 (or the eNB 300) using one or more antennas 301. Some or all of the antennas 301 may be configured for simultaneous operation in multiple frequency bands, while some or all of those antennas 301 may be configured for operation in a single frequency band. In addition, any suitable combination of such antennas 301 may also be used.

Figure 4:
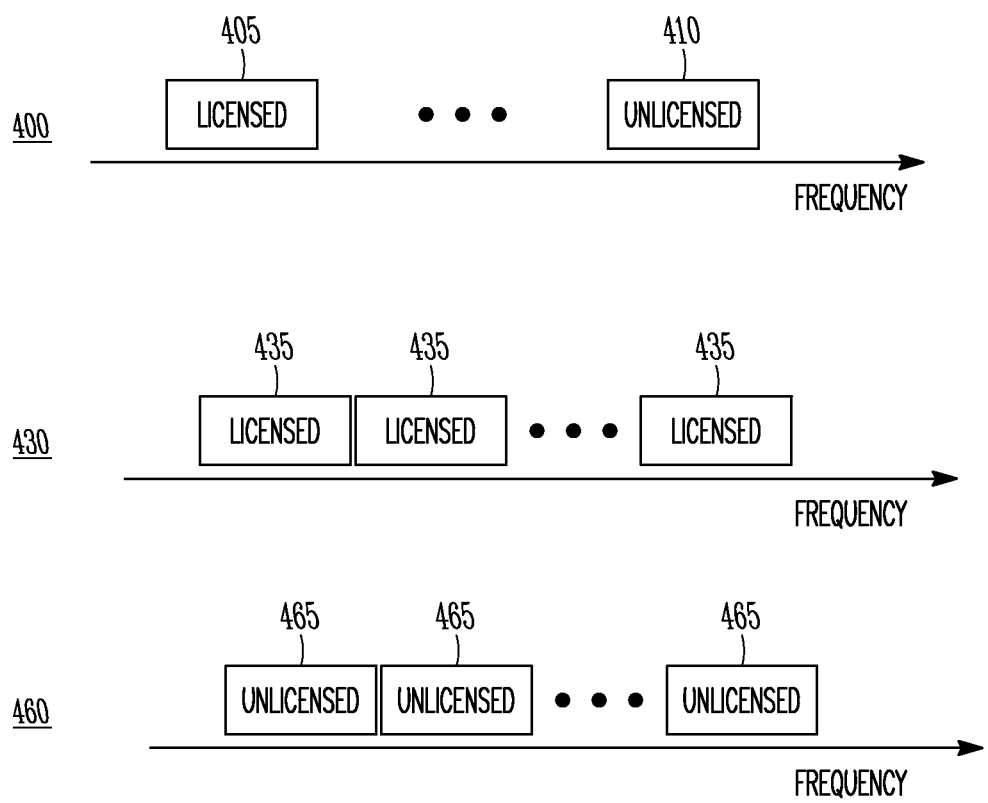
FIG. 4 illustrates examples of Carrier Aggregation (CA) scenarios in accordance with some embodiments.

FIG. 4 illustrates examples of Carrier Aggregation (CA) scenarios in accordance with some embodiments. Although the examples shown in FIG. 4 may serve to illustrate concepts related to CA of multiple frequency bands, embodiments are not limited to these examples or to the number or types of frequency bands shown in the examples. In the scenario 400, a licensed frequency band 405 and an unlicensed frequency band 410 may operate according to CA such that the eNB 104 and UEs 102 may communicate over either or both of the frequency bands 405, 410. Although the scenario 400 shows the licensed frequency band 405 and unlicensed frequency band 410 as being separated in frequency, this is not limiting, as the two frequency bands 405, 410 may be adjacent in some cases. In addition, multiple licensed frequency bands 405 and/or multiple unlicensed frequency bands 410 may be used in some cases. In some embodiments, operations such as registration and exchanging of control messages may be performed over the licensed frequency band 405 while exchanging of traffic packets may be performed over both frequency bands 405, 410. It should be noted that the traffic packets may include data packets, voice packets or a combination thereof. In some embodiments, traffic packets may include data content, voice content or user content.

As a non-limiting example, the licensed frequency band 405 may support a primary cell (Pcell) of UEs 102 while the unlicensed frequency band 410 may support one or more secondary cells (Scell) of UEs 102 on an opportunistic basis. In this example, the licensed frequency band 405 may be used for exchanging both traffic packets and control messages like Radio Resource Control (RRC) messages. In addition, the unlicensed frequency band 410 may be used for augmenting data capacity or throughput when needed by the network, such as during busy periods. In some embodiments, the unlicensed frequency band 410 may be divided in frequency into multiple unlicensed channels.

Another scenario 430 illustrates CA of multiple licensed frequency bands 435, while the scenario 460 illustrates CA of multiple unlicensed frequency bands 465. The multiple frequency bands 435, 465 may or may not be adjacent in frequency, and are not limited to the arrangement or number of bands shown in the example of FIG. 4. Throughout this disclosure, methods and techniques may refer to usage of a licensed frequency band and an unlicensed frequency band, but such embodiments are not limiting. In some embodiments, similar methods and techniques may be employed in arrangements that include various combinations of licensed and unlicensed frequency bands, including arrangements that exclusively use licensed or unlicensed frequency bands. For instance, a method that uses a licensed frequency band and an unlicensed frequency band may be applied, in some cases, to an arrangement that uses a "first licensed frequency band" and a "second licensed frequency band."

Figure 5:
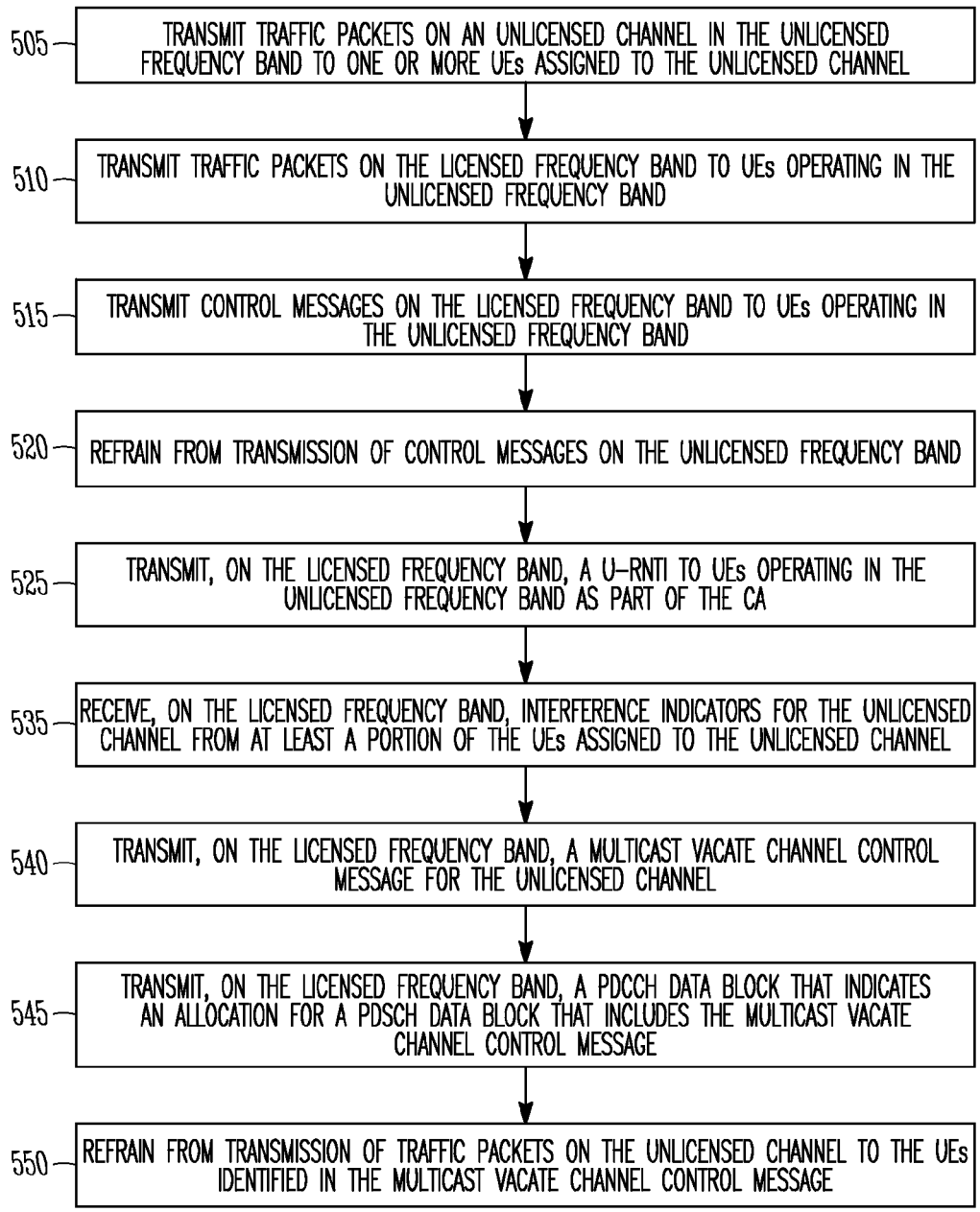
FIG. 5 illustrates the operation of a method for supporting CA of licensed and unlicensed frequency bands in accordance with some embodiments.

FIG. 5 illustrates the operation of a method for supporting CA of licensed and unlicensed frequency bands in accordance with some embodiments. Although the method 500 may refer to a licensed frequency band and an unlicensed frequency band, embodiments are not limited as such, and some embodiments may include a different number of frequency bands and/or different types (licensed or unlicensed) of frequency bands. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-10, although it is understood that the method 500 may be practiced with any other suitable systems, interfaces and components.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). Moreover, the method 500 and other methods described herein may be practiced by wireless devices configured to operate in other suitable types of wireless communication systems, including systems configured to operate according to various IEEE standards such as IEEE 802.11.

In some embodiments, the licensed frequency band may support one or more primary cells (Pcell) of UEs 102 and the unlicensed frequency band may support one or more secondary cells (Scell) of UEs 102 as part of the CA, as previously described. In addition, UEs 102 included in the Scells may be configured for unlicensed LTE (LTE-U) operation as part of the CA. The unlicensed frequency band may be divided in frequency to include one or more unlicensed channels, and UEs 102 may be assigned to an unlicensed channel.

At operation 505 of the method 500, the eNB 104 may transmit traffic packets on an unlicensed channel in the unlicensed frequency band to one or more UEs 102 assigned to the unlicensed channel. At operation 510, the eNB 104 may transmit traffic packets on the licensed frequency band to UEs 102 operating in the unlicensed frequency band. Accordingly, the eNB 104 may transmit traffic packets on both the licensed and unlicensed frequency bands as part of the CA, as previously described. The eNB 104 may also receive traffic packets on both the licensed and unlicensed frequency bands as part of the CA in some embodiments.

At operation 515, the eNB 104 may transmit control messages on the licensed frequency band to UEs 102 operating in the unlicensed frequency band. At operation 520, the eNB 104 may refrain from transmission of control messages on the unlicensed frequency band. Accordingly, transmission of control messages to the UEs 102 may be restricted to the licensed frequency band as part of the CA, as previously described.

At operation 525, the eNB 104 may transmit an unlicensed radio network temporary identifier (U-RNTI) to UEs 102 operating in the unlicensed frequency band. As will be described below, the U-RNTI may be used to identify control information intended for users of the unlicensed frequency band. The U-RNTI, which may be considered control information, may be transmitted on the licensed frequency band in accordance with the CA arrangement previously described by operations 505-520. In some embodiments, the U-RNTI may be transmitted to all LTE-U capable UEs 102, including some that may not currently be operating in an unlicensed frequency bands but are capable of doing so. In some embodiments, the U-RNTI may be transmitted in a broadcast message, such as a System Information Block (SIB) message of 3GPP or other standards. These embodiments are not limiting, however, and the U-RNTI may be transmitted to one or more UEs 102 in any suitable manner, including the use of dedicated or group control messages transmitted through unicast, multicast or broadcast techniques.

At operation 535, the eNB 104 may receive, on the licensed frequency band, interference indicators for the unlicensed channel from at least a portion of the UEs 102 assigned to the unlicensed channel. The interference indicators may be received individually from each of the UEs 102 on control messages in the licensed frequency band, in some embodiments. The interference indicators may be related to or may characterize interference affecting the UEs 102 or detected at the UEs 102. In some embodiments, the interference may be from a system or device uncoordinated with the eNB 104, such as a Wi-Fi network or a radar signal.

The UEs 102 may determine an interference indicator for reporting to the eNB 104. The determination may be performed using various techniques such as measurement and/or analysis of received interference signal power, signal-to-interference-plus-noise ratio (SINR), error rates or other. In some embodiments, the interference indicator may indicate that significant interference (in comparison to a threshold, for instance) affects the UE 102. Embodiments are not limited to just this form of an interference indicator, however, as other techniques may include transmission of similar or related interference information to the eNB 104. As an example, a Boolean value of "yes/no" or similar may indicate if significant interference affects the UE 102. As another example, a scalar or dB quantity related to signal power, SINR or other measurement at the UE 102 may be transmitted to the eNB 104 for further processing.

Figure 6:
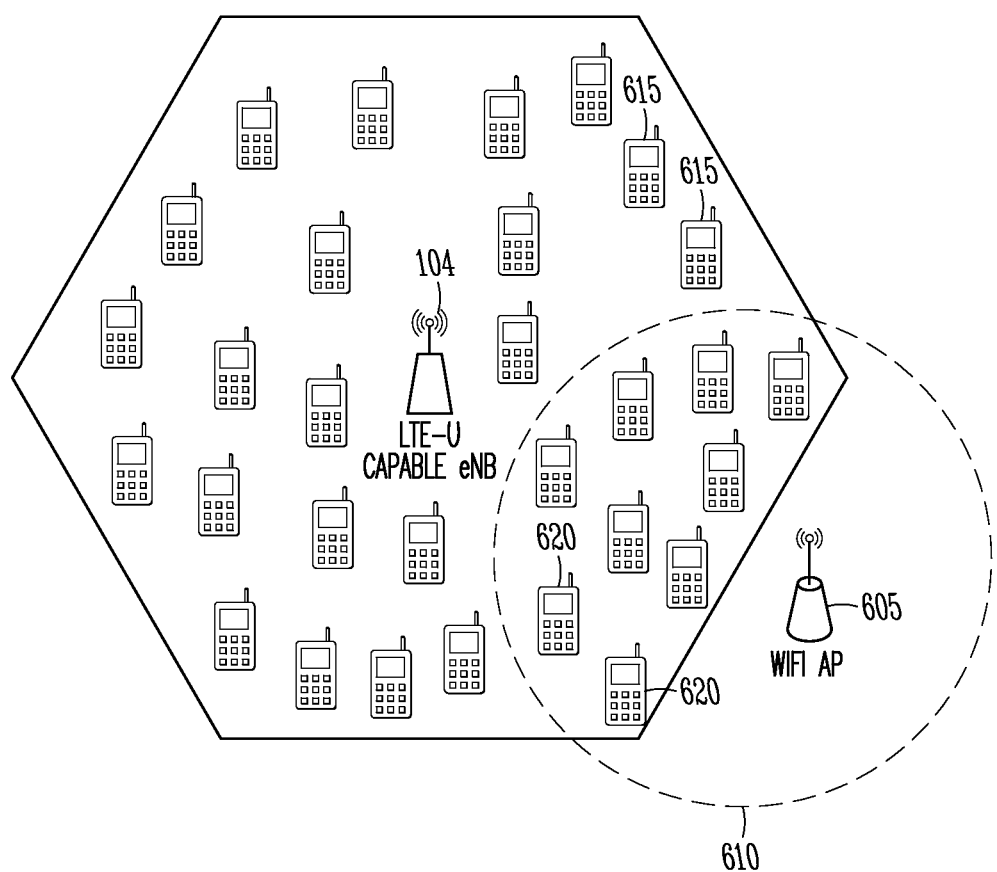
FIG. 6 illustrates an example of an interference scenario caused to a network by a device operating as part of another system in accordance with some embodiments.

FIG. 6 illustrates an example of an interference scenario caused to a network by a device operating as part of another system in accordance with some embodiments. The eNB 104 may be LTE-U capable, and may communicate with UEs 615, 620 (which may be UEs 102 or 200, and may be LTE-U capable) in a CA arrangement with a licensed frequency band and an unlicensed channel of an unlicensed frequency band. A Wi-Fi AP 605 may operate in frequency that overlaps, or partially overlaps, the unlicensed channel and may therefore provide significant interference to the UEs 620 that are physically located in the region 610. The UEs 615 outside of the region 610 may be unaffected or not significantly affected by the Wi-Fi AP 605 in this example scenario. The UEs 620 may each determine an interference indicator using previously described techniques, and may transmit the interference indicator to the eNB 104.

Returning to the method 500, at operation 540, the eNB 104 may transmit a multicast vacate channel control message for the unlicensed channel, and may transmit the message in the licensed frequency band. At operation 545, the eNB 104 may transmit, on the licensed frequency band, a PDCCH data block that indicates an allocation for a PDSCH data block that includes the multicast vacate channel control message. In some embodiments, the multicast vacate channel control message may notify the UEs 102 from which the interference indicators are received that the UEs 102 are to vacate the unlicensed channel. That is, the eNB 104 may instruct the UEs 102 that are experiencing significant interference (as reported via the interference indicators) to vacate the unlicensed channel. As an example, the eNB 104 in FIG. 6 may transmit such a message to the UEs 620 that may have reported significant interference from the Wi-Fi AP 605.

In some embodiments, the multicast vacate channel control message may be transmitted at least partly in response to the reception of the interference indicators. As an example, the multicast vacate channel control message may be transmitted when the portion of the UEs 102 from which interference indicators for the unlicensed channel are received exceeds a predetermined threshold. That is, a determination at the eNB 104 that the number of interference indicators is high, or exceeds a threshold, may trigger the transmission of the multicast vacate channel control message. The threshold may be a quantity of UEs 102, a fraction or percentage of UEs 102 operating on the unlicensed channel or any suitable quantity which may be predetermined through analysis or simulation. It should be noted that the threshold may be lower than the total number of UEs 102 operating in the unlicensed channel. That is, the portion of the UEs 102 from which interference indicators for the unlicensed channel are received may exclude at least one of the UEs 102 assigned to the unlicensed channel in some cases.

It may be beneficial to use a multicast technique for sending notification to the UEs 102 to vacate the unlicensed channel. In particular, when the number of such UEs 102 is high, it is possible that much of the information that would be included in individual dedicated control messages may be redundant. In addition, many of the UEs 102 may begin to experience significant interference at roughly the same time. For instance, when the Wi-Fi AP 605 in FIG. 6 is first powered up and begins transmitting, a spike in the number of UEs 620 being interfered with may suddenly rise, and the eNB 104 may have to notify many UEs 620 to vacate the unlicensed channel. The exchanging of individual control messages, such as "RRC Connection Reconfiguration" messages or similar, for each UE 620 may be overwhelming for the network with such a large burst of control traffic. In addition, the use of individual messages may be impractical and unnecessary, and a multicast format may be more suitable.

Figure 7:
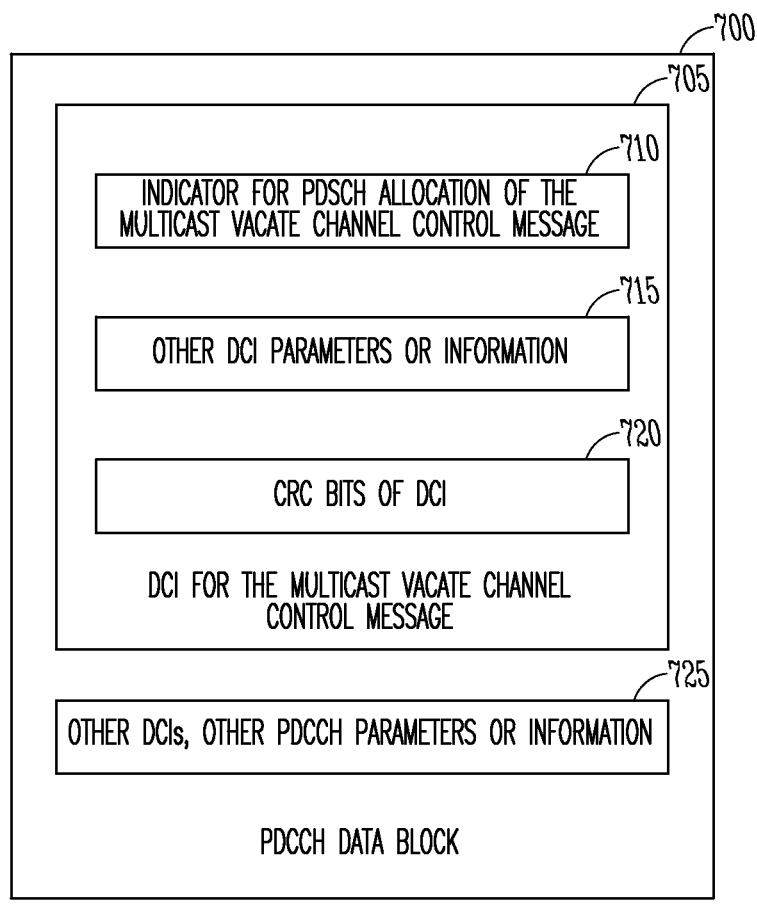
FIG. 7 illustrates an example of a physical downlink control channel (PDCCH) data block in accordance with some embodiments.

FIG. 7 illustrates an example of a physical downlink control channel (PDCCH) data block in accordance with some embodiments. It is important to note that some embodiments of the PDCCH data block 700 may include some or all of the parameters shown, and are not limited to the order in which the parameters are presented in FIG. 7. The PDCCH data block 700 may include a DCI 705 for a multicast vacate channel control message. Although not limited, the PDCCH data block 700 may also include other DCIs or other PDCCH parameters or information 725 in some cases. The DCI 705 may include an indicator 710 for PDSCH allocation of the multicast vacate channel control message. That is, the indicator 710 may describe which resources in the PDSCH include the multicast vacate channel control message or how to decode it. Although not limited, the DCI 705 may also include other DCI parameters or information 715 in some cases. The DCI 720 may also include CRC bits 720 of the DCI 705. The CRC bits 720 may be scrambled using the U-RNTI described previously. As such, UEs 102 that know the U-RNTI may determine if the DCI 705 is intended for them.

Figure 8:
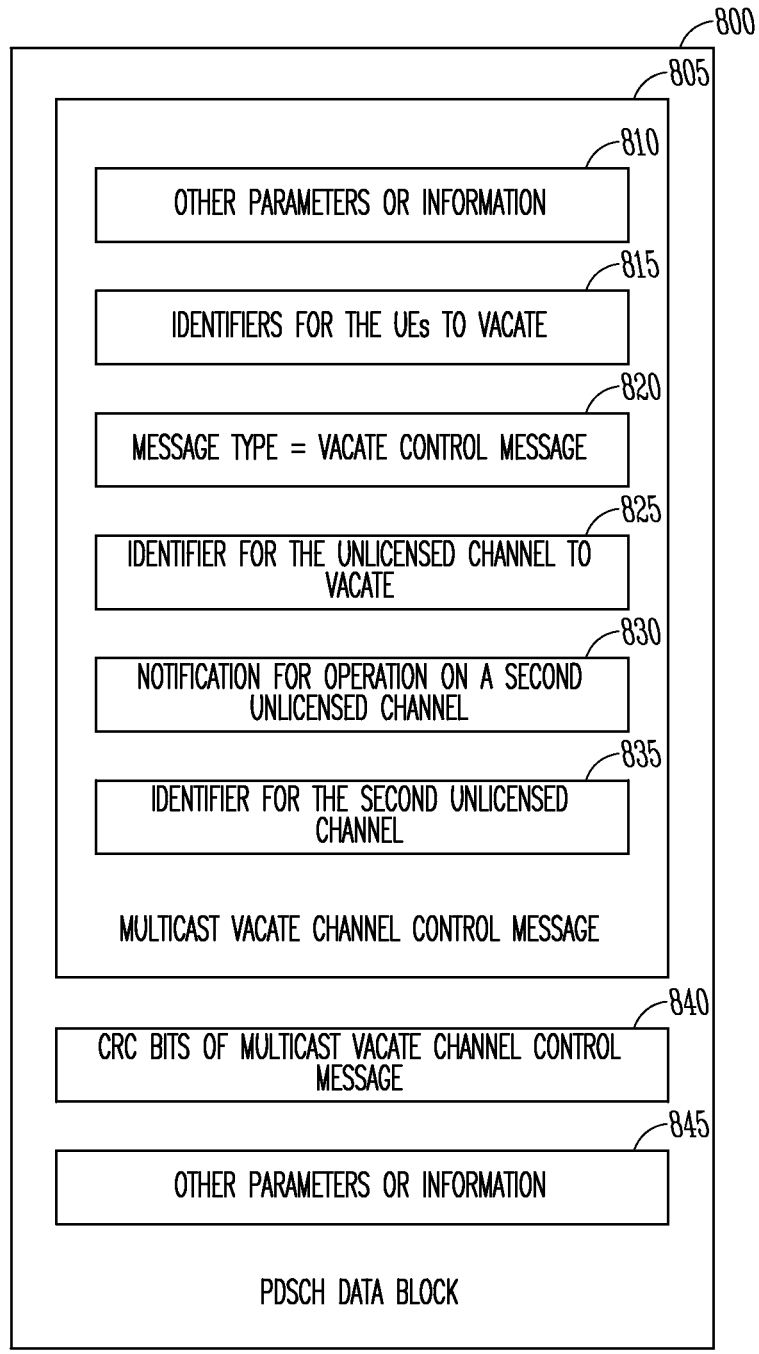
FIG. 8 illustrates an example of a physical downlink shared channel (PDSCH) data block in accordance with some embodiments.

FIG. 8 illustrates an example of a physical downlink shared channel (PDSCH) data block in accordance with some embodiments. The PDSCH data block 800 may include a multicast vacate channel control message 805 as shown. It is important to note that some embodiments of the PDSCH data block 800 and of the multicast vacate channel control message 805 may include some or all of the parameters shown, and are not limited to the order in which the parameters are presented in FIG. 8. Although not limited, the multicast vacate channel control message 805 may include other parameters or information 810 in some cases. The multicast vacate channel control message 805 may also include identifiers 815 for the UEs 102 that are to vacate the unlicensed channel. As an example, a Cell RNTI (C-RNTI) or an International Mobile Subscriber Identity (IMSI) of each UE 102 may be used. The multicast vacate channel control message 805 may also include a message type 820 that may take on a value such as "vacate control message" or similar to indicate that the message is to instruct the UEs 102 identified in the list of identifiers 815 to vacate the unlicensed channel. An identifier 825 of the unlicensed channel to vacate may also be included. A notification 830 for operation on a second unlicensed channel and an identifier 835 for the second unlicensed channel may also be included. The PDSCH data block 800 may also include CRC bits 840 of the multicast vacate channel control message 805. In some embodiments, the CRC bits 840 may be scrambled by the same U-RNTI. Although not limited, the PDSCH data block 800 may also include other parameters or information 845 in some cases.

It should be noted that the eNB 104 may transmit the U-RNTI to UEs 102 operating in the unlicensed frequency band, including UEs 102 operating in the unlicensed channel referred to above or in other unlicensed channels. In addition, LTE-U capable UEs 102 may also receive the U-RNTI even when not currently operating in unlicensed frequency bands. As such, all LTE-U capable UEs 102 in connected mode may read the PDCCH DCIs that are intended for LTE-U capable UEs (that is, the DCIs for which CRC bits are scrambled by the U-RNTI). Those PDCCH DCIs may be located in the common search space of the PDCCH. Accordingly, a UE 102 operating in a second, different unlicensed channel may decode the multicast vacate channel control message 805. It may then discard or ignore the message as irrelevant after inspection of the identifiers 815 of UEs 102 to vacate or the identifier 825 of the unlicensed channel.

The PDCCH data block 700 and PDSCH data block 800 illustrate examples for transmitting a multicast vacate channel control message for informing UEs 102 to vacate an unlicensed channel in accordance with a 3GPP network. However, it is understood that embodiments are not limited to the examples or to 3GPP networks. The techniques described regarding FIGS. 7-8 may be used with other networks or systems with possible modifications to accommodate message formats and/or protocols of the other networks or systems.

Returning to the method 500, at operation 550, the eNB 104 may refrain from transmission of traffic packets on the unlicensed channel to the UEs 102 identified in the multicast vacate channel control message. The eNB 104 may also refrain from reception of traffic packets on the unlicensed channel from those UEs 102. That is, after the eNB 104 notifies the UEs 102 to vacate the unlicensed channel, the eNB 104 may no longer communicate with those UEs 102 on that unlicensed channel. In some cases, the eNB 104 may begin to communicate with some or all of those UEs 102 on different unlicensed channels or on the licensed frequency band.

Figure 9:
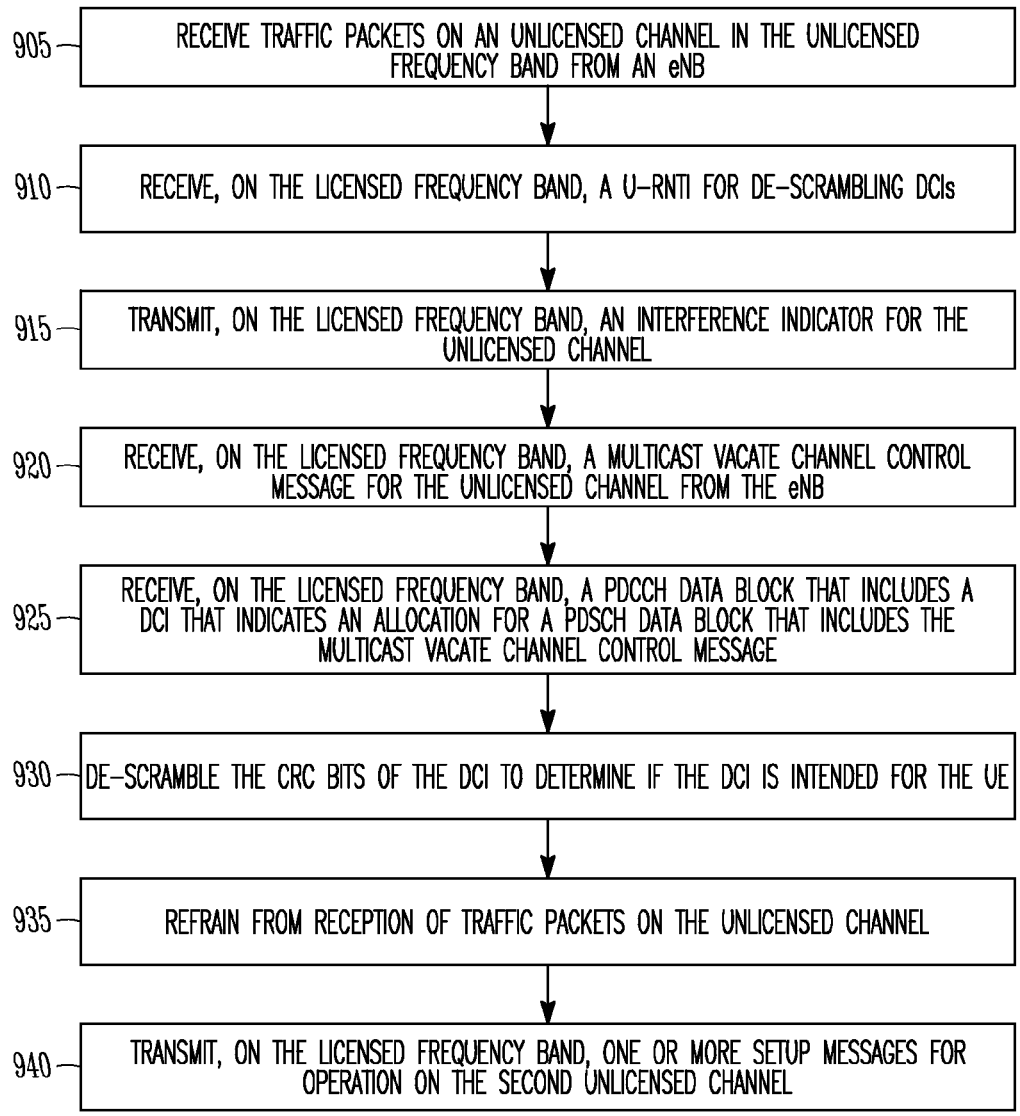
FIG. 9 illustrates the operation of another method for supporting CA of licensed and unlicensed frequency bands in accordance with some embodiments.

FIG. 9 illustrates the operation of another method for supporting CA of licensed and unlicensed frequency bands in accordance with some embodiments. Although the method 900 may refer to a licensed frequency band and an unlicensed frequency band, embodiments are not limited as such, and some embodiments may include a different number of frequency bands and/or different types (licensed or unlicensed) of frequency bands. As mentioned previously regarding the method 500, embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to FIGS. 1-8 and 10, although it is understood that the method 900 may be practiced with any other suitable systems, interfaces and components. In addition, embodiments of the method 900 may refer to eNBs 104, UEs 102, APs, STAs or other wireless or mobile devices.

It should be pointed out that the method 900 may be practiced at a UE 102 while the method 500 may be practiced at an eNB 104. Some of the operations in each method 500, 900 may be similar to or related to operations in the other. Accordingly, some or all of the discussion of techniques and operations for each method 500, 900 may apply to the other method in some cases.

At operation 905, the UE 102 may receive traffic packets on an unlicensed channel in the unlicensed frequency band from the eNB 104 as part of the CA. The UE 102 may also transmit traffic packets on the unlicensed channel to the eNB 104 as part of the CA. In addition, the UE 102 may receive traffic packets and control messages from the eNB 104 on the licensed frequency band as part of the CA. Accordingly, at operation 910, the UE 102 may receive, on the licensed frequency band, a U-RNTI for de-scrambling CRC bits of DCIs included in PDCCH data blocks as previously described regarding the method 500. As previously described, the U-RNTI may be received in any suitable manner, including the use of dedicated or group control messages transmitted through unicast, multicast or broadcast techniques. As an example, the U-RNTI may be received in a broadcast message such as a System Information Block (SIB) message of 3GPP or other standards. The UE 102 may also transmit traffic packets and control messages to the eNB 104 on the licensed frequency band as part of the CA.

At operation 915, the UE 102 may transmit, on the licensed frequency band, an interference indicator for the unlicensed channel. As an example, the interference indicator may be transmitted when an interference level from another system at the UE 102 exceeds a predetermined interference threshold. The interference indicator and techniques for its determination and transmission may be similar to or the same as described earlier regarding the method 500.

At operation 920, the UE 102 may receive, on the licensed frequency band, a multicast vacate channel control message for the unlicensed channel from the eNB 104. In some embodiments, the multicast vacate channel control message may be included in a PDSCH data block. Accordingly, at operation 925, the UE 102 may receive, on the licensed frequency band, a PDCCH data block that includes a DCI that indicates an allocation for the PDSCH data block. As previously described, CRC bits of the DCI may be scrambled by the U-RNTI. The UE 102 may use the U-RNTI to de-scramble the CRC bits of the DCI to determine if the DCI is intended for the UE 102 at operation 930.

It should be noted that the example PDCCH 700 and PDSCH 800 described earlier and shown in FIGS. 7-8 may be used in these operations of the method 900. The UE 102 may determine if it is an intended recipient of the multicast vacate channel control message and if the eNB 104 is instructing the UE 102 to vacate the unlicensed channel. If so, the UE 102 may refrain from reception of traffic packets on the unlicensed channel at operation 935. The UE 102 may also refrain from transmission of traffic packets on the unlicensed channel. In addition, the UE 102 may also determine from the multicast vacate channel control message if the eNB 104 instructs it to operate on a second unlicensed channel. If so, the UE 102 may transmit, on the licensed frequency band, one or more setup messages for operation on the second unlicensed channel in response, at operation 940. That is, the transmission of the setup messages may be performed at least partly in response to the notification for operation on the second unlicensed channel as part of the multicast vacate channel control message.

Figure 10:
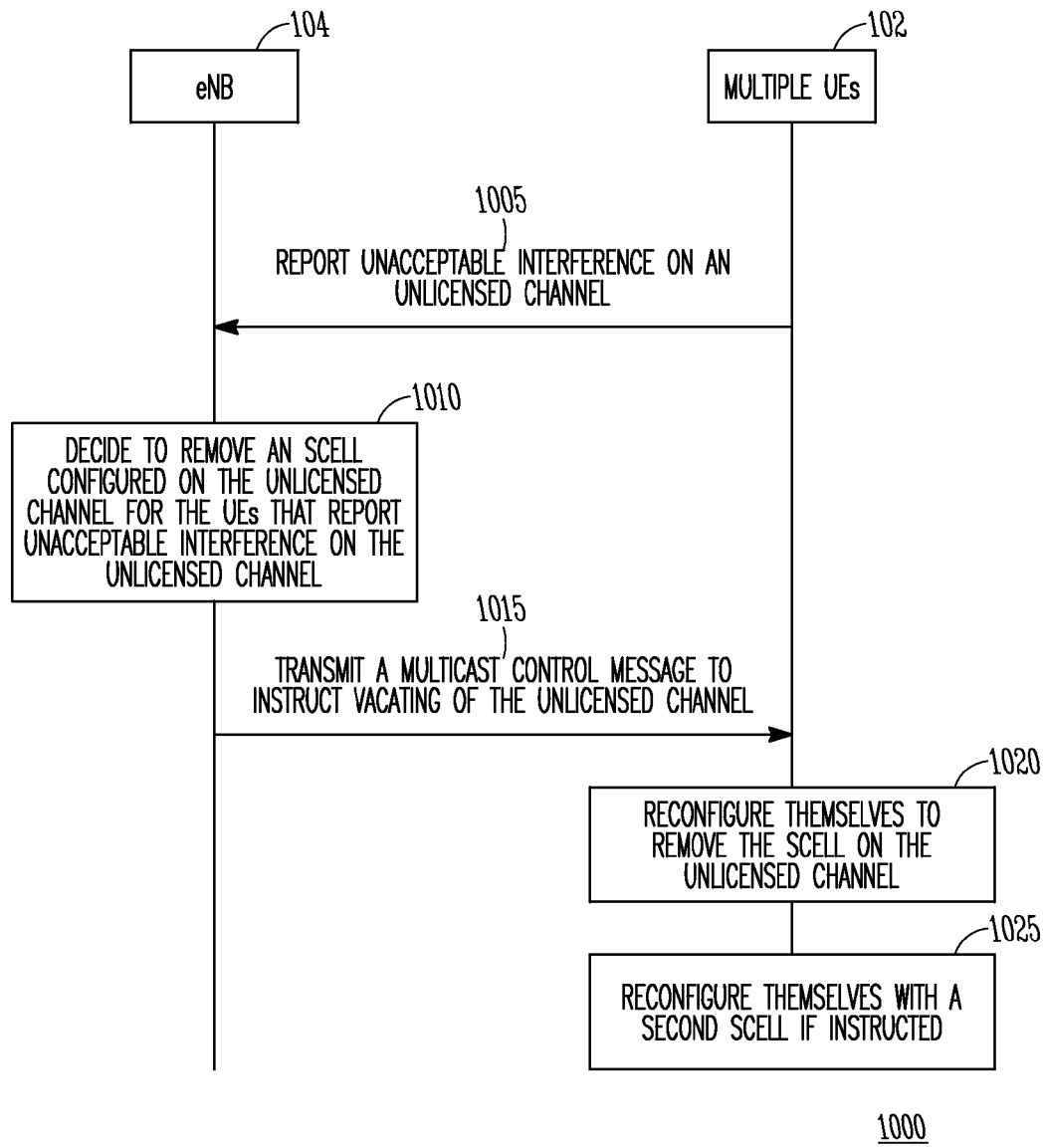
FIG. 10 illustrates the operation of another method for supporting CA of licensed and unlicensed frequency bands in accordance with some embodiments.

FIG. 10 illustrates the operation of another method for supporting CA of licensed and unlicensed frequency bands in accordance with some embodiments. Although the method 1000 may refer to a licensed frequency band and an unlicensed frequency band, embodiments are not limited as such, and some embodiments may include a different number of frequency bands and/or different types (licensed or unlicensed) of frequency bands. It should be noted that some of the operations of the method 1000 may be similar to operations included in the methods 500 or 900. In such cases, descriptions of such operations in the methods 500 or 900 may be applicable to corresponding operations included in the method 1000. Fewer or additional operations may be included in other embodiments of connection or reconnection methods, and the chronological order of operations is not limited to that shown in FIG. 10.

At operation 1005, multiple UEs 102 may report unacceptable interference on an unlicensed channel of the unlicensed frequency band, which may be in the form of the interference indicator previously described. At operation 1010, the eNB 104 may decide to remove an Scell configured on the unlicensed channel for the UEs 102 that report unacceptable interference on the unlicensed channel. Removal of the Scell for those users may be similar to or the same as vacating the unlicensed channel as previously described. At operation 1015, the eNB 1015 may transmit a multicast control message to instruct vacating of the unlicensed channel. Similar techniques and message formats related to the previously described multicast vacate channel control message may be used. For example, the PDCCH 700 and PDSCH 800 described earlier may be used. At operation 1020, the UEs 102 may reconfigure themselves to remove the Scell on the unlicensed channel, which may be similar to or the same as vacating the unlicensed channel and refraining from usage of the unlicensed channel as previously described. That is, the UEs 102 may determine that they are to remove the Scell by inspecting the multicast vacate channel control message such as in FIG. 8. The UEs 102 may also determine from that inspection whether or not they are to reconfigure themselves with a second Scell, which may be similar to setting up operation on a second unlicensed channel as previously described.

An Evolved Node-B (eNB) to support Carrier Aggregation (CA) for a licensed frequency band and an unlicensed frequency band is disclosed herein. The eNB may comprise hardware processing circuitry configured to transmit traffic packets on an unlicensed channel in the unlicensed frequency band to one or more User Equipments (UEs) assigned to the unlicensed channel. The hardware processing circuitry may be further configured to receive, on the licensed frequency band, interference indicators for the unlicensed channel from at least a portion of the UEs assigned to the unlicensed channel. The hardware processing circuitry may be further configured to transmit, on the licensed frequency band, a multicast vacate channel control message for the unlicensed channel. In some embodiments, the multicast vacate channel control message may be transmitted at least partly in response to the reception of the interference indicators.

In some embodiments, the licensed frequency band may support one or more primary cells (Pcell) of UEs and the unlicensed frequency band may support one or more secondary cells (Scell) of UEs. In some embodiments, UEs included in the Scells may be configured for unlicensed LTE (LTE-U) operation as part of the CA. In some embodiments, the multicast vacate channel control message may be to notify the UEs from which the interference indicators are received that the UEs are to vacate the unlicensed channel. In some embodiments, the multicast vacate channel control message may include an identifier for the unlicensed channel and identifiers for the UEs that are to vacate the unlicensed channel. In some embodiments, the multicast vacate channel control message may further include an identifier for a second unlicensed channel and a notification for operation on the second unlicensed channel.

The hardware processing circuitry may be further configured to refrain from transmission of traffic packets on the unlicensed channel to the UEs identified in the multicast vacate channel control message. In some embodiments, the multicast vacate channel control message may be included in a physical downlink shared channel (PDSCH) data block. The hardware processing circuitry may be further configured to transmit, on the licensed frequency band, a physical downlink control channel (PDCCH) data block that includes a downlink control information (DCI) block that indicates an allocation for the PDSCH data block. In some embodiments, CRC bits of the DCI may be scrambled by an unlicensed radio network temporary identifier (U-RNTI). In some embodiments, CRC bits of the multicast vacate channel control message may be scrambled by the same U-RNTI. The hardware processing circuitry may be further configured to transmit, on the licensed frequency band, the U-RNTI to UEs operating in the unlicensed frequency band as part of the CA. In some embodiments, the U-RNTI may be transmitted to at least one UE that is not assigned to the unlicensed channel and is assigned to a second, different unlicensed channel.

In some embodiments, the portion of the UEs from which interference indicators for the unlicensed channel are received may exclude at least one of the UEs assigned to the unlicensed channel. In some embodiments, the multicast vacate channel control message may be transmitted when the portion of the UEs from which interference indicators for the unlicensed channel are received exceeds a predetermined threshold. The hardware processing circuitry may be further configured to transmit, as part of the CA, traffic packets on the licensed frequency band to UEs operating in the unlicensed frequency band. The hardware processing circuitry may be further configured to refrain from, as part of the CA, transmission of control messages on the unlicensed frequency band. In some embodiments, the interference indicators may be further for interference from a system uncoordinated with the eNB.

A non-transitory computer-readable storage medium that stores instructions for execution by one or more processors to perform operations for support of Carrier Aggregation (CA) for a licensed frequency band and an unlicensed frequency band is also disclosed herein. The operations may configure the one or more processors to transmit traffic packets on an unlicensed channel in the unlicensed frequency band to one or more User Equipments (UEs) assigned to the unlicensed channel. The operations may configure the one or more processors to receive, on the licensed frequency band, interference indicators for the unlicensed channel from at least a portion of the UEs assigned to the unlicensed channel. The operations may configure the one or more processors to transmit, on the licensed frequency band, a multicast vacate channel control message for the unlicensed channel.

In some embodiments, the multicast vacate channel control message may be transmitted at least partly in response to the reception of the interference indicators. In some embodiments, the multicast vacate channel control message may be to notify the UEs from which the interference indicators are received that the UEs are to vacate the unlicensed channel. In some embodiments, the multicast vacate channel control message may be included in a physical downlink shared channel (PDSCH) data block. The operations may further configure the one or more processors to transmit, on the licensed frequency band, a physical downlink control channel (PDCCH) data block that includes a downlink control information (DCI) block that indicates an allocation for the PDSCH data block. In some embodiments, CRC bits of the DCI may be scrambled by an unlicensed radio network temporary identifier (U-RNTI). The operations may further configure the one or more processors to transmit, on the licensed frequency band, the U-RNTI to UEs operating in the unlicensed frequency band as part of the CA.

A method of supporting, at an Evolved Node-B (eNB), Carrier Aggregation (CA) for a licensed frequency band and an unlicensed frequency band is disclosed herein. The method may include receiving, from one or more User Equipments (UEs) assigned to the unlicensed channel, interference indicators for interference detected at the UEs on the unlicensed channel. The method may further include transmitting a multicast vacate channel control message to notify the UEs that the UEs are to vacate the unlicensed channel. In some embodiments, the unlicensed frequency band may be configured for exchanging of traffic packets between the eNB and the UEs and may be restricted from exchanging control messages between the eNB and the UEs. In some embodiments, the interference indicators and the multicast vacate channel control message may be exchanged on the licensed frequency band. In some embodiments, the multicast vacate channel control message may be transmitted at least partly in response to the reception of the interference indicators.

In some embodiments, the multicast vacate channel control message may be included in a physical downlink shared channel (PDSCH) data block. The method may further include transmitting, on the licensed frequency band, a physical downlink control channel (PDCCH) data block that includes a downlink control information (DCI) block that indicates an allocation for the PDSCH data block. In some embodiments, CRC bits of the DCI are scrambled by an unlicensed radio network temporary identifier (U-RNTI). The method may further include transmitting, on the licensed frequency band, the U-RNTI to UEs operating in the unlicensed frequency band as part of the CA.

User Equipment (UE) to support Carrier Aggregation (CA) for a licensed frequency band and an unlicensed frequency band is also disclosed herein. The UE may comprise hardware processing circuitry configured to receive traffic packets on an unlicensed channel in the unlicensed frequency band from an Evolved Node-B (eNB). The hardware processing circuitry may be further configured to transmit, on the licensed frequency band, an interference indicator for the unlicensed channel when an interference level at the UE exceeds a predetermined interference threshold. The hardware processing circuitry may be further configured to receive, on the licensed frequency band, a multicast vacate channel control message for the unlicensed channel from the eNB. The hardware processing circuitry may be further configured to refrain from, at least partly in response to the reception of the vacate channel control message, reception of traffic packets on the unlicensed channel.

In some embodiments, the UE may be assigned to the unlicensed channel and the multicast vacate channel control message may be to notify at least a portion of UEs assigned to the unlicensed channel to vacate the unlicensed channel. In some embodiments, the multicast vacate channel control message may include an identifier for the unlicensed channel and identifiers for the UEs that are to vacate the unlicensed channel. In some embodiments, the multicast vacate channel control message may further include an identifier for a second unlicensed channel and a notification for operation on the second unlicensed channel. The hardware processing circuitry may be further configured to transmit, on the licensed frequency band, one or more setup messages for operation on the second unlicensed channel, wherein the transmission is at least partly in response to the notification for operation on the second unlicensed channel.

In some embodiments, the multicast vacate channel control message may be included in a physical downlink shared channel (PDSCH) data block. The hardware processing circuitry may be further configured to receive, on the licensed frequency band, a physical downlink control channel (PDCCH) data block that includes a downlink control information (DCI) block that indicates an allocation for the PDSCH data block. In some embodiments, CRC bits of the DCI may be scrambled by an unlicensed radio network temporary identifier (U-RNTI). The hardware processing circuitry may be further configured to de-scramble the CRC bits of the DCI to determine if the DCI is intended for the UE. The hardware processing circuitry may be further configured to receive, on the licensed frequency band, the U-RNTI.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An Evolved Node-B (eNB) to support Carrier Aggregation (CA) for a licensed frequency band and an unlicensed frequency band, the eNB comprising hardware processing circuitry and a transceiver configured to:
   transmit traffic packets on an unlicensed channel in the unlicensed frequency band to one or more User Equipments (UEs) assigned to the unlicensed channel;
   receive, on the licensed frequency band, interference indicators for the unlicensed channel from at least a portion of the UEs assigned to the unlicensed channel; and
   transmit, on the licensed frequency band, a physical downlink control channel (PDCCH) data block that includes a downlink control information (DCI) block that indicates an allocation for a physical downlink shared channel (PDSCH) data block, the PDSCH data block comprising a multicast vacate channel control message for the unlicensed channel,
   wherein the multicast vacate channel control message is transmitted at least partly in response to the reception of the interference indicators, and
   the multicast vacate channel control message is to notify the UEs from which the interference indicators are received that the UEs are to vacate the unlicensed channel.

2. The eNB according to claim 1, wherein:
   the licensed frequency band supports one or more primary cells (Pcell) of UEs and the unlicensed frequency band supports one or more secondary cells (Scell) of UEs; and
   UEs included in the Scells are configured for unlicensed LTE (LTE-U) operation as part of the CA.

3. The eNB according to claim 1, wherein the multicast vacate channel control message includes an identifier for the unlicensed channel and identifiers for the UEs that are to vacate the unlicensed channel.

4. The eNB according to claim 3, wherein the multicast vacate channel control message further includes an identifier for a second unlicensed channel and a notification for operation on the second unlicensed channel.

5. The eNB according to claim 3, the hardware processing circuitry further configured to refrain from transmission of traffic packets on the unlicensed channel to the UEs identified in the multicast vacate channel control message.

6. The eNB according to claim 1, wherein: CRC bits of the DCI are scrambled by an unlicensed radio network temporary identifier (U-RNTI).

7. The eNB according to claim 6, wherein CRC bits of the multicast vacate channel control message are scrambled by the U-RNTI.

8. The eNB according to claim 6, the hardware processing circuitry further configured to transmit, on the licensed frequency band, the U-RNTI to UEs operating in the unlicensed frequency band as part of the CA.

9. The eNB according to claim 8, wherein the U-RNTI is transmitted to at least one UE that is not assigned to the unlicensed channel and is assigned to a second, different unlicensed channel.

10. The eNB according to claim 1, wherein the portion of the UEs from which interference indicators for the unlicensed channel are received excludes at least one of the UEs assigned to the unlicensed channel.

11. The eNB according to claim 1, wherein the multicast vacate channel control message is transmitted when the portion of the UEs from which interference indicators for the unlicensed channel are received exceeds a predetermined threshold.

12. The eNB according to claim 1, the hardware processing circuitry further configured to:
    transmit, as part of the CA, traffic packets on the licensed frequency band to UEs operating in the unlicensed frequency band; and
    refrain from, as part of the CA, transmission of control messages on the unlicensed frequency band.

13. The eNB according to claim 1, wherein the interference indicators are further for interference from a system uncoordinated with the eNB.

14. A method of supporting, at an Evolved Node-B (eNB), Carrier Aggregation (CA) for a licensed frequency band and an unlicensed frequency band, the method comprising:
receiving, from one or more User Equipments (UEs) assigned to the unlicensed channel, interference indicators for interference detected at the UEs on the unlicensed channel; and
transmitting, on the licensed frequency band, a physical downlink control channel (PDCCH) data block that includes a downlink control information (DCI) block that indicates an allocation for a physical downlink shared channel (PDSCH) data block, the PDSCH data block comprising a multicast vacate channel control message to notify the UEs that the UEs are to vacate the unlicensed channel,
wherein the unlicensed frequency band is configured for exchanging of traffic packets between the eNB and the UEs and is restricted from exchanging control messages between the eNB and the UEs; and
wherein the interference indicators and the multicast vacate channel control message are exchanged on the licensed frequency band, and
wherein the multicast vacate channel control message is transmitted at least partly in response to the reception of the interference indicators.

15. The method according to claim 14, wherein: CRC bits of the DCI are scrambled by an unlicensed radio network temporary identifier (U-RNTI); and the method further comprises transmitting, on the licensed frequency band, the U-RNTI to UEs operating in the unlicensed frequency band as part of the CA.

16. A non-transitory computer-readable storage medium that stores instructions for execution by one or more processors to perform operations for support of Carrier Aggregation (CA) for a licensed frequency band and an unlicensed frequency band, the operations to configure the one or more processors to:
transmit traffic packets on an unlicensed channel in the unlicensed frequency band to one or more User Equipments (UEs) assigned to the unlicensed channel;
receive, on the licensed frequency band, interference indicators for the unlicensed channel from at least a portion of the UEs assigned to the unlicensed channel; and
transmit, on the licensed frequency band, a physical downlink control channel (PDCCH) data block that includes a downlink control information (DCI) block that indicates an allocation for a physical downlink shared channel (PDSCH) data block, the PDSCH data block comprising a multicast vacate channel control message for the unlicensed channel;
wherein the multicast vacate channel control message is transmitted at least partly in response to the reception of the interference indicators.

17. The non-transitory computer-readable storage medium according to claim 16, wherein the multicast vacate channel control message is to notify the UEs from which the interference indicators are received that the UEs are to vacate the unlicensed channel.

18. The non-transitory computer-readable storage medium according to claim 17, wherein:
CRC bits of the DCI are scrambled by an unlicensed radio network temporary identifier (U-RNTI); and
the operations further configure the one or more processors to transmit, on the licensed frequency band, the U-RNTI to UEs operating in the unlicensed frequency band as part of the CA.

19. User Equipment (UE) to support Carrier Aggregation (CA) for a licensed frequency band and an unlicensed frequency band, the UE comprising hardware processing circuitry and a transceiver configured to:
receive traffic packets on an unlicensed channel in the unlicensed frequency band from an Evolved Node-B (eNB);
transmit, on the licensed frequency band, an interference indicator for the unlicensed channel when an interference level at the UE exceeds a predetermined interference threshold;
receive, on the licensed frequency band, a physical downlink control channel (PDCCH) data block that includes a downlink control information (DCI) block that indicates an allocation for a physical downlink shared channel (PDSCH) data block, the PDSCH data block comprising a multicast vacate channel control message for the unlicensed channel from the eNB; and
at least partly in response to the reception of the vacate channel control message, refrain from reception of traffic packets on the unlicensed channel.

20. The UE according to claim 19, wherein the UE is assigned to the unlicensed channel and the multicast vacate channel control message is to notify at least a portion of UEs assigned to the unlicensed channel to vacate the unlicensed channel.

21. The UE according to claim 20, wherein the multicast vacate channel control message includes an identifier for the unlicensed channel and identifiers for the UEs that are to vacate the unlicensed channel.

22. The UE according to claim 21, wherein the multicast vacate channel control message further includes an identifier for a second unlicensed channel and a notification for operation on the second unlicensed channel.

23. The UE according to claim 22, the hardware processing circuitry further configured to transmit, on the licensed frequency band, one or more setup messages for operation on the second unlicensed channel, wherein the transmission is at least partly in response to the notification for operation on the second unlicensed channel.

24. The UE according to claim 20, wherein:
CRC bits of the DCI are scrambled by an unlicensed radio network temporary identifier (U-RNTI); and
the hardware processing circuitry is further configured to de-scramble the CRC bits of the DCI to determine if the DCI is intended for the UE.

25. The UE according to claim 24, the hardware processing circuitry further configured to receive, on the licensed frequency band, the U-RNTI.

* * * * *